United States Patent [19]

Paulik

[11] Patent Number: 4,617,533

[45] Date of Patent: Oct. 14, 1986

[54] CIRCUIT ARRANGEMENT FOR A BLOCKING OSCILLATOR SWITCHING POWER UNIT

[75] Inventor: Ernst Paulik, Hilgertshausen, Fed. Rep. of Germany

[73] Assignee: Siemens Aktiengesellschaft, Berlin & Munich, Fed. Rep. of Germany

[21] Appl. No.: 701,391

[22] Filed: Feb. 14, 1985

[30] Foreign Application Priority Data

Feb. 17, 1984 [DE] Fed. Rep. of Germany ....... 3405833

[51] Int. Cl.⁴ .............................................. H03K 3/16
[52] U.S. Cl. .................................. 331/113 A; 331/148
[58] Field of Search .................... 331/113 A, 146, 148

[56] References Cited

U.S. PATENT DOCUMENTS 4,045,711  8/1977  Pitel ................................ 331/113 A Primary Examiner—Gene Wan
Attorney, Agent, or Firm—Hill, Van Santen, Steadman & Simpson

[57] ABSTRACT

A blocking oscillator contains a switching transistor which is driven by an integrated circuit. This circuit receives its supply voltage during the blocking phase from a winding at the primary side. A further winding at the primary side supplies the regulating variable for the integrated circuit during the flow phase. The supply input of the integrated circuit is connected by way of a further transistor and a diode to the control winding and a Zener diode biases the base of the further transistor. In the start-up phase in which the voltage of the supply winding (control winding) is built up, the circuit supplies the required operating voltage and switches off again in the steady state of the power unit.

4 Claims, 1 Drawing Figure

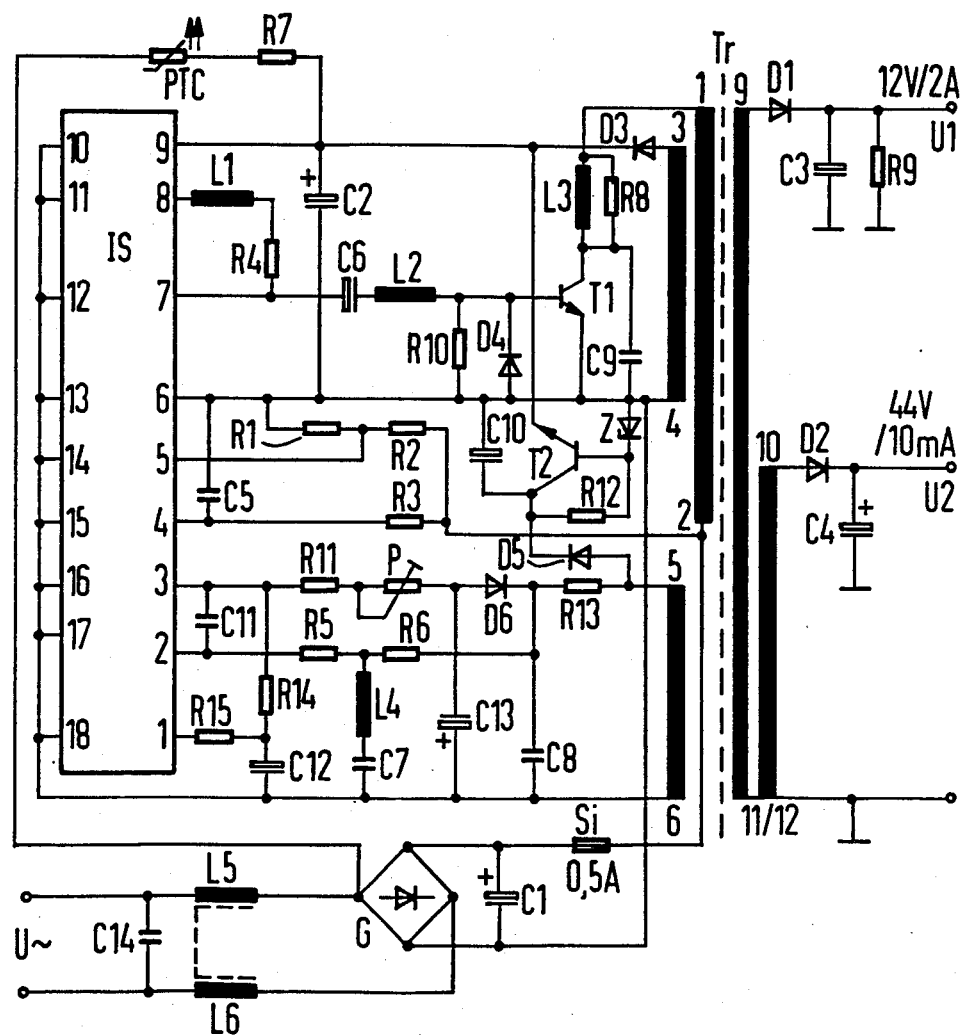

CIRCUIT ARRANGEMENT FOR A BLOCKING OSCILLATOR SWITCHING POWER UNIT

BACKGROUND OF THE INVENTION

1. Field of the Invention

The present invention relates to a circuit arrangement for a blocking oscillator switching power unit which comprises a transformer having at least three windings at the primary side and at least one winding at the secondary side, a switching transistor which periodically applies a rectified and smoothed input voltage to a first winding at the primary side, an integrated circuit which drives the switching transistor, receives a rectified and smoothed supply voltage via a second winding at the primary side during the blocking phase and receives a test voltage via a third winding at the primary side during the flow phase, whereby an input of the integrated drive circuit registering the zero-axis crossings of the test voltage is connected to the one end of the test winding and the supply voltage input of the drive circuit is connected to the one end of the supply winding via a diode and to an a.c. voltage input of the input voltage rectifier via a resistor.

2. Description of the Prior Art

A blocking oscillator circuit of the type generally set forth above is described in the Siemens Brochure "Schaltnetzteile mit der IS TDA 4600", (FIG. 20).

In the known circuit, the drive module receives its energy from a supply winding at the primary side that is wound such that the supply voltage follows the stabilized output voltage. The range of regulation is correspondingly high and the circuit can operate with high voltages between 90 volts and 270 volts. It is disadvantageous, however, that the output voltage, after the device has been switched on, can only build up with the same speed with which the output capacitors are charged. Measures must therefore be undertaken in order to assure that the drive circuit already receives an adequately-high voltage in the start-up phase. The initially mentioned publication provides that an alternating voltage be taken from the network for this purpose, this voltage being smoothed, rectified and then applied to the supply input of the drive circuit. This start-up aid, however, does not always operate satisfactorily; it cannot be dimensioned such without further measures that, on the one hand, it supplies enough energy in the start-up phase and, on the other hand, does not have a disturbing effect during normal operation.

SUMMARY OF THE INVENTION

The object of the present invention, therefore, is to provide a blocking oscillator circuit of the type generally set forth above having a cut-in aid which guarantees a reliable start and which subsequently shuts off.

The above object is achieved, in a circuit having the elements and operation set forth above, by providing a transistor which is connected to the supply input on the one hand and, via a diode, to one end of the control winding and by providing that the transistor base is connected to the other end of the supply winding via a Zener diode.

FIG. 26 of the above-mentioned publication discloses a circuit which is known per se wherein the supply input of the drive module is likewise connected to a transistor which is preceded by a diode and whose base is connected to the grounded end of the control finding via a Zener diode. In that circuit, however, the voltage is not taken from the control winding, but from the network, namely for the purpose of accelerating the start-up process and not, for instance, making it more reliable.

BRIEF DESCRIPTION OF THE DRAWING

Other objects, features and advantages of the invention, its organization, construction and operation will be best understood from the following detailed description, taken in conjunction with the accompanying drawing, on which there is a single FIGURE which in a schematic circuit diagram of a circuit arrangement constructed in accordance with the present invention.

DESCRIPTION OF THE PREFERRED EMBODIMENTS

Referring to the drawing, a circuit arrangement is illustrated for two output voltages of 12 V and, respectively, 44 V. The integrated blocking oscillator circuit IS may be the module TDA 4601 D which is basically described in the publication SIEMENS "Schaltbeispiele", 1980/81 Edition pp. 194–197. The integrated circuit IS assumes the drive, regulation and monitoring of the switching transistor T1 in the free-running blocking oscillator power unit. The circuit is designed for an a.c. input line voltage U of 90 V–270 V which is rectified by way of a rectifier bridge G and supplied to the charging capacitor C1. The switching transistor T1 periodically applies this voltage across the capacitor C1 to the winding 3-4 of the blocking oscillator transformer Tr, whereby the integrated circuit IS assumes the required regulation.

During the blocking time of the switching transistor T1, voltage peaks arise at the secondary windings 9/10–11/12, these voltage peaks being rectified by way of the diodes D1 and D2 and yielding the operating voltages. These operating voltages can be adjusted with a potentiometer P.

The output load may fluctuate between 0% and 100%, whereby no-load, short-circuit and overload protection are provided.

In the start-up phase, as long as the positive temperature coefficient (PTC) resistor PTC is cold, it supplies the required current for a few seconds in order to charge the capacitor C2 to the supply voltage for the integrated circuit IS. The supply voltage is supplied to the integrated circuit IS via the input 9. The integrated circuit IS can therefore supply the first base current pulses for the switching transistor T1. After the start-up phase, the supply to the integrated circuit IS occurs via the diode D3 from the transformer winding 3-4. Its winding direction produces a stabilized d.c.voltage, whereby this voltage can only build up with the same speed with which the output capacitor C3, C4 are charged. Due to the use of a "stabilized phase" for the supply voltage of the integrated circuit IS, the advantage is achieved that this voltage is nearly constant for input voltages between 90 V and 270 V.

The charge stored in the capacitor C2, however, does not always suffice for a reliable start-up process. During the start-up time, a d.c. voltage is therefore switched with the transistor T2 to the input 9, this being acquired from the transformer winding 5-6 in the unstabilized phase. An a.c. voltage component which can be rectified with the diode D5 is already present in the unstabilized phase after the first current pulse. After the power unit has run up, the transistor, in turn, switches off due to the Zener diode Z connected to its base.

Prevention against too low a mains or network voltage is achieved by the voltage divider R1, R2 at the input 5 which exhibits the output terminal 8 as an additional trigger and inhibit possibility given downward transgression of a predetermined voltage.

In the regulating mode, the zero-axis crossings of the voltage fed in from the feedback winding 5-6 are registered at the input 2 of the integrated circuit IS and forwarded to the control logic.

The amplitude changes of the control winding 5-6 which are rectified with the diode D6 are applied to the terminal 3. A simulation of the collector current of the switching transistor T1 occurs by way of an external RC element R3/C5 at the terminal 4 and internally by way of threshold voltages established in the integrated circuit IS. When the capacitance of the capacitor C5 is increased, the highest possible collector current of the switching transistor T1 increases (turning point). The desired range of regulation is therefore defined.

The primary winding 1-2 is connected, on the one hand, to the positive pole via a fuse Si and, on the other hand, is connected by way of the resistor-capacitor elements R8, C9 to the negative pole of the source U via the rectifier G. Consequently, AC line fluctuations which occur produce voltage changes at the winding 1-2 which are transformed at the control winding 5-6 and the transformer winding 3-4.

Therefore, the collector current rise of the switching transistor T1 is defined by the inductance of the winding 1-2. A simulation of the sawtooth-shaped rise is carried out by the external resistor-capacitor elements R3, C5 and is supplied to the terminal 4 of the integrated circuit IS. The winding 1-2 and the resistor and capacitor elements R3, C5 therefore lie at the same potential.

Within the integrated circuit IS, the sawtooth-shaped rise at the terminal 4 is pressed on a base current amplifier and is employed, via a terminal 8, for driving the switching transistor T1. With this technique, a base control which is proportional to the collector current is achieved and an over-saturation of the base of the switching transistor T1 is avoided.

The switching transistor T1 is driven via the terminal 7 of the integrated circuit, whereby a negative feedback L1/R4 with an external resistor is introduced between the terminal 7 and the terminal 8, the value of resistance thereof defining the maximum amplitude of the base drive current for the switching transistor T1.

The capacitor C6 serves for separation of the potentials between the transistor T1 and the integrated circuit IS.

Given a shorted output, the output voltage is nearly zero, so that the noise oscillations generated by the switching events of the transistor T1 generate "false zero-axis crossings" which, in turn, effect a cut-in of the transistor. Since much magnetic energy is still stored in the transformer at this time, the transformer core is driven into saturation. The transformer looses its inductive properties with this procedure, whereby the current rises greatly, this leading to a destruction of the switching transistor in the final analysis.

The LC series resonant circuit L4/C7 which is connected via the resistor R5 to the input 2 of the integrated circuit IS serves for "extracting" the overshoots of the switching transistor T1. The resonant frequency of the LC element is thereby tuned to the frequency of the aperiodically decaying noise oscillation. The resistance and capacitance derived from the optimization of the regulating properties. The value of the inductance L4 can be calculated according to the following equation.

$$L = 1/(4\ C f_u)$$

where $f_u$ is the frequency of the noise oscillation.

When the circuit is to separately protected against overvoltages, it is recommended to place a Zener diode of, for example, 18 V between the two terminals 6 and 9 of the integrated circuit. This Zener diode cuts off brief voltage peaks and is destroyed given overvoltages of longer duration. It then forms a permanent short and the power unit is therefore shut off.

A preferred dimensioning of the components of the illustrative embodiment is set forth below in tabular form.

| Component | Value or Designation |
| --- | --- |
| R1 | 5.6 kΩ |
| R2, R3 | 270 kΩ |
| R4 | 3 kΩ |
| R5 | 10 kΩ |
| R6 | 330 Ω |
| R7 | 2.7 kΩ |
| R8 | 560 Ω |
| R9 | 220 Ω |
| R10 | 27 Ω |
| R11 | 12 kΩ |
| R12 | 5.1 kΩ |
| R13 | 100 Ω |
| R14 | 1.2 kΩ |
| R15 | 100 Ω |
| P | 10 kΩ |
| D1 | BYW 72 |
| D2, D3 | BY 360 |
| D4 | I N 4007 |
| D5, D6 | BY 360 |
| Z | B7X83C11 |
| C1, C2, C6, C12 | 100 μF |
| C3 | 1000 μF |
| C4 | 10 μF |
| C5 | 4.7 nF |
| C7, C9 | 2.2 nF |
| C8 | 3.3 nF |
| C10, C13 | 1 μF |
| C11 | 100 pF |
| C14 | 0.33 μF |
| T1 | BU 508 A |
| T2 | BC 639 |
| IS | TDA 4601 D |
| L1 | Tube Core 1 wdg. |
| L2 | RF Inductor 2.2 μH |
| L3 | Tube Core 5 Wdg. |
| L5/L6 | Anti-interference Inductor 2 × 47 mH |

The circuit arrangement illustrated on the drawing is designed for maximum output powers of up to 30 W. It can preferably be used in a miniature switching power unit. A number of possibilities of use are available for the circuit arrangement of the invention, for example as a power supply for video recorders, video cameras, camera recorders, large radio recorders, high fidelity components, typewriters, personal copiers and home computers, floppy disk drives, printers and plotters, as well as measuring and testing units. Another possiblity of use is in charging devices having a stabilized output voltage for lead and nickel-cadmium (NC) storage batteries, particularly for rapid charging of NC sintered cells, whereby devices having discharged accumulators can be immediately used again when the charging device is plugged in. These charging devices are suitable, for example, for video portables, video cameras, camera recorders, photoflash devices, electric tools (screwdrivers, drills, grass cutters), model vehicles (electric planes, electric cars, transmitter and receiver batteries), wheelchairs, automobile batteries, as well as briefcase computers.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a circuit arrangement for a blocking oscillator switching power unit of the type in which a transformer includes at least three windings on its primary side and at least one winding on its secondary side, in which a switching transistor circuit is operated to periodically apply a rectified and smooth input voltage to a first of the primary side windings, in which a drive circuit is connected to and operates to drive the switching transistor circuit and receives a rectified and smoothed supply voltage via a second winding at the primary side during the blocking phase and receives a test voltage from one end of a third winding at the primary side during the flow phase, whereby the drive circuit can register the zero-axis crossings of the test voltage, and in which the drive circuit includes a supply input connected to one end of the second winding via a diode and to an a.c. voltage input of an input voltage rectifier via a resistor, the improvement comprising:

a further diode connected to one end of the third winding, and a further switching transistor, said further switching transistor including a controlled-conduction path connected between said further diode and the supply input of the drive circuit, and a base, and a Zener diode connecting said base to the other end of the second winding and operable during a start-up time to switch the output of the voltage rectifier to the supply input of the drive circuit until said Zener diode causes said further switching transistor to switch off.

2. The improved circuit arrangement of claim 1, wherein:

the resistor is a positive temperature coefficient resistor.

3. The improved circuit arrangement of claim 1, and further comprising:

an inductance-capacitance series resonant circuit for selective filtering, said series resonant circuit connected to the third winding and to an input of the drive circuit which registers the zero axis crossings of the test voltage.

4. The improved circuit arrangement of claim 1, and further comprising:

a further Zener diode connected between the supply input of the drive circuit and the other end of the second winding.

* * * * *